(12) United States Patent
Singh et al.

(10) Patent No.: US 12,493,405 B2
(45) Date of Patent: Dec. 9, 2025

(54) METHODS, SYSTEMS AND COMPUTER PROGRAM PRODUCTS FOR ENABLING SCROLLING WITHIN A SOFTWARE APPLICATION

(71) Applicant: NOW.GG, INC., Campbell, CA (US)

(72) Inventors: Harsh Singh, Delhi (IN); Pawan Kumar, Gurugram (IN); Vasim Ali, New Delhi (IN); Ravi Prakash, Gurugram (IN)

(73) Assignee: NOW.GG, INC., Campbell, CA (US)

( * ) Notice: Subject to any disclaimer, the term of this patent is extended or adjusted under 35 U.S.C. 154(b) by 0 days.

(21) Appl. No.: 17/412,326

(22) Filed: Aug. 26, 2021

(65) Prior Publication Data

US 2022/0066605 A1      Mar. 3, 2022

Related U.S. Application Data

(60) Provisional application No. 63/090,782, filed on Oct. 13, 2020.

(30) Foreign Application Priority Data

Aug. 26, 2020    (IN) .............................. 202011036830

(51) Int. Cl.
| | |
|---|---|
| *G06F 3/0485* | (2022.01) |
| *G06F 3/038* | (2013.01) |
| *G06F 3/04812* | (2022.01) |
| *G06F 3/0488* | (2022.01) |

(52) U.S. Cl.
CPC ........ *G06F 3/0485* (2013.01); *G06F 3/04812* (2013.01); *G06F 3/0488* (2013.01); *G06F 3/038* (2013.01)

(58) Field of Classification Search
CPC .. G06F 3/0485; G06F 3/04812; G06F 3/0488; G06F 3/038
See application file for complete search history.

(56) References Cited

U.S. PATENT DOCUMENTS

| | | | | |
|---|---|---|---|---|
| 2009/0027337 | A1* | 1/2009 | Hildreth | G06F 3/017 345/158 |
| 2010/0328215 | A1* | 12/2010 | Cheng | G06F 3/0485 345/163 |
| 2013/0254714 | A1* | 9/2013 | Shin | G06F 3/0488 715/810 |
| 2019/0369829 | A1* | 12/2019 | Turner | G06F 3/0487 |
| 2019/0370091 | A1* | 12/2019 | Ozer | G06F 9/452 |

* cited by examiner

*Primary Examiner* — Ting Z Lee
(74) *Attorney, Agent, or Firm* — The Webb Law Firm

(57) ABSTRACT

The present disclosure relates to implementing scrolling controls within a software application. More particularly, the present disclosure relates to methods and systems of mapping and translating inputs received from one or more controllers or user interfaces communicatively coupled to a computing system or device on which a software application is being executed, to one or more instructions or events for implementing a scrolling event that the software application is configured to recognize.

15 Claims, 7 Drawing Sheets

METHODS, SYSTEMS AND COMPUTER PROGRAM PRODUCTS FOR ENABLING SCROLLING WITHIN A SOFTWARE APPLICATION

CROSS-REFERENCE TO RELATED APPLICATIONS

This application claims priority to Indian Patent Application No. 202011036830 filed Aug. 26, 2020, and U.S. Provisional Patent Application No. 63/090,782, filed Oct. 13, 2020, the disclosures of which are hereby incorporated by reference in their entirety.

FIELD OF THE INVENTION

The present disclosure relates to implementing scrolling controls within a software application. More particularly, the present disclosure relates to methods and systems of mapping and translating inputs received from one or more controllers or user interfaces communicatively coupled to a computing system or device on which a software application is being executed, to one or more instructions or events for implementing a scrolling event that the software application is configured to recognize.

BACKGROUND

Software applications are controlled through input devices coupled to or integrated with computing systems that are implementing or executing such software applications. These input devices enable a user to interface with the software applications and to provide control or state change instructions to software applications.

FIG. 1 illustrates an exemplary system environment 100 of a type used for implementation of one or more software applications. System environment 100 comprises computing system 102 communicably coupled with one or more input devices 104 (for example integrated or peripheral input devices such as a keyboard, a touch pad, a mouse, a game pad, a motion sensor/detector, a joystick or other form of input controller). Computing system 102 may additionally be in network communication with cloud 106 (which cloud 106 may comprise any internetwork, network backend or network backbone, for example, the internet).

Computing system 102 includes an input layer comprising a processor implemented input layer controller, a network traffic layer comprising a processor implemented network traffic layer controller 1024, a disk data layer comprising a processor implemented disk data layer controller 1026, and an application controller 1028.

Input layer controller 1022 is configured to communicate with one or more input device(s) to receive and transmit control data and/or state data from and to, input device(s) 104 to a software application being executed through computing system 102. Network traffic layer controller 1024 is configured to receive and transmit control data and/or state data between cloud 106 and the software application. Disk data layer controller 1026 is configured to retrieve control data and/or state data from one or more databases and to use such data for the purposes of executing or controlling the software application.

Application controller 1028 is communicably coupled with one or more of input layer controller 1022, network traffic layer controller 1024 and disk data layer controller 1026, and is configured to execute and control the software application based on software code corresponding to the software application, and based on data received from one or more of input layer controller 1022, network traffic layer controller 1024 and disk data layer controller 1026.

In the illustrated embodiment, application controller 1028 comprises graphics controller 1030 configured to render one or more graphic objects on a display device (e.g. a display screen), based on (i) software code corresponding to the software application and/or (ii) data received from one or more of input layer controller 1022, network traffic layer controller 1024 and disk data layer controller 1026. The illustrated application controller 1028 also includes audio controller 1032 configured to generate and control audio output through one or more audio devices (e.g. a speaker or headphones), based on (i) the software code corresponding to the software application, and/or (ii) data received from one or more of input layer controller 1022, network traffic layer controller 1024 and disk data layer controller 1026. Application controller 1028, graphics controller 1030 and audio controller 1032 may be configured to receive data from and transmit data to one or more of disk data layer controller 1026, network traffic layer controller 1024, input layer controller 1022, cloud 106 and/or input device(s) 104 for the purposes of achieving the functionality of the software application.

With increasing availability of software applications, and availability of devices and platforms on which software applications can be executed, there has been a growing demand for customization of user interfaces and user-experience. The demand for customization has been particularly felt with regard to the ability to select and use different input devices and input device controllers to control or provide inputs to software application programs which may not have been designed for use with such input devices/controllers/inputs. This is particularly the case with game related software applications, where users prefer a high level of control personalization—both in terms of devices that can be used to control the game and user inputs/user input sequences that can be used to trigger instructions or events that are recognized by the game related software applications.

It has also been found that with increasing cross-operating system runtime through virtual machine environments (which enables applications that are developed for a first operating system (for example the Android OS) to be executed on a machine running a second operating system as a host operating system (for example, the macOS™ or Windows™ operating systems)), controls that have been defined for a program written for the first operating system may be unavailable or inefficient when said program is being executed within the second operating system through the virtual machine environment.

Further, particularly in case of gaming programs that have been designed for execution within a first operating system (for example the Android OS), it is found that when such programs are being executed on a machine running a second operating system as a host operating system (for example, the macOS™ or Windows™ operating systems), the scrolling functionality of the gaming environment is poorly implemented.

There is accordingly a need for effective solutions to map scrolling instructions received from one or more controllers or user interfaces communicatively coupled to a computing device on which a software application is being executed, to one or more scrolling instructions or scrolling events that said software application is configured or optimized to recognize.

SUMMARY

The disclosure provides methods and systems for detecting cursor positioning events or instructions received from one or more controllers or user interfaces communicatively coupled to a computing system or device on which a software application is being executed, and translating these instructions or inputs to one or more user interface scrolling instructions or events that said software application is configured to recognize.

The invention provides a method for implementing scrolling within a display rendered by a software application. The method comprises implementing at a processor, the steps of (i) receiving from a cursor positioning hardware device, one or more data signals representing a cursor positioning event, (ii) identifying the cursor positioning event, and (iii) responsive to determining that the identified cursor positioning event is mapped to a scrolling instruction associated with a software program being executed, implementing the scrolling instruction within the software program.

In an embodiment of the method, identifying the cursor positioning event comprises identifying a position on a display or display interface at which a cursor requires to be displayed, positioned or moved to.

In another embodiment of the method, the cursor positioning hardware device is not a touch sensor based cursor positioning hardware device.

In a particular method embodiment, the cursor positioning hardware device is configured to control positioning of a cursor independent of user input from any of a touchpad or touchscreen or touch sensor.

In another method embodiment, the scrolling instruction to which the identified cursor positioning event is mapped is a touch sensor triggered scrolling instruction.

The invention additionally provides a system for implementing scrolling within a display rendered by a software application. The system comprises a memory, and a processor. The processor may be configured to implement the steps of (i) receiving from a cursor positioning hardware device, one or more data signals representing a cursor positioning event, (ii) identifying the cursor positioning event, and (iii) responsive to determining that the identified cursor positioning event is mapped to a scrolling instruction associated with a software program being executed, implementing the scrolling instruction within the software program.

The system may be configured such that identifying the cursor positioning event comprises identifying a position on a display or display interface at which a cursor requires to be displayed, positioned or moved to.

In an embodiment, the system may be configured such that the cursor positioning hardware device is not a touch sensor based cursor positioning hardware device.

In another embodiment, the system may be configured such that the cursor positioning hardware device is configured to control positioning of a cursor independent of user input from any of a touchpad or touchscreen or touch sensor.

The system may include an embodiment wherein the scrolling instruction to which the identified cursor positioning event is mapped is a touch sensor triggered scrolling instruction.

The invention additionally provides a computer program product for implementing scrolling within a display rendered by a software application, the computer program product comprising a non-transitory computer usable medium having computer readable program code embodied therein. The computer readable program code comprises instructions for implementing at a processor, the steps of (i) receiving from a cursor positioning hardware device, one or more data signals representing a cursor positioning event, (ii) identifying the cursor positioning event, and (iii) responsive to determining that the identified cursor positioning event is mapped to a scrolling instruction associated with a software program being executed, implementing the scrolling instruction within the software program.

In an embodiment of the computer program product, identifying the cursor positioning event comprises identifying a position on a display or display interface at which a cursor requires to be displayed, positioned or moved to.

In another embodiment of the computer program product, the cursor positioning hardware device is not a touch sensor based cursor positioning hardware device.

In a further embodiment of the computer program product, the cursor positioning hardware device is configured to control positioning of a cursor independent of user input from any of a touchpad or touchscreen or touch sensor.

In a specific embodiment of the computer program product, the scrolling instruction to which the identified cursor positioning event is mapped is a touch sensor triggered scrolling instruction.

BRIEF DESCRIPTION OF THE ACCOMPANYING DRAWINGS

Figure 5:
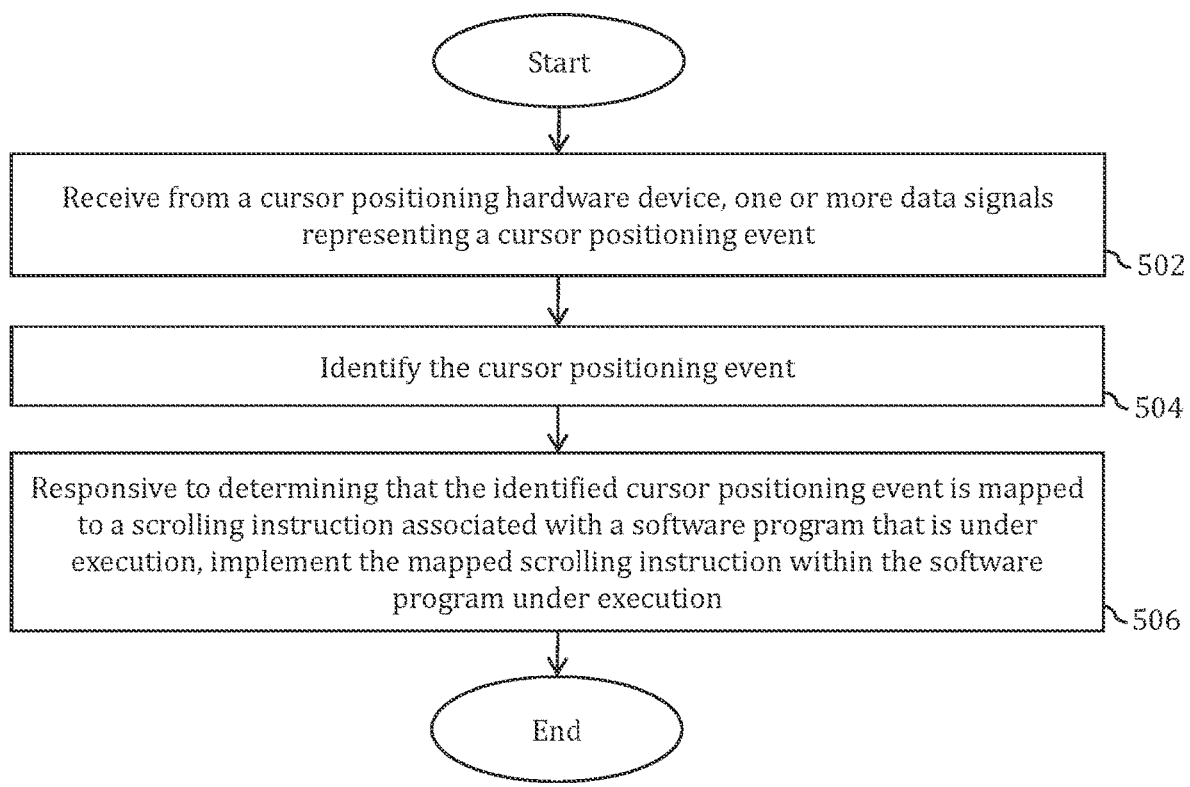
Figure 6:
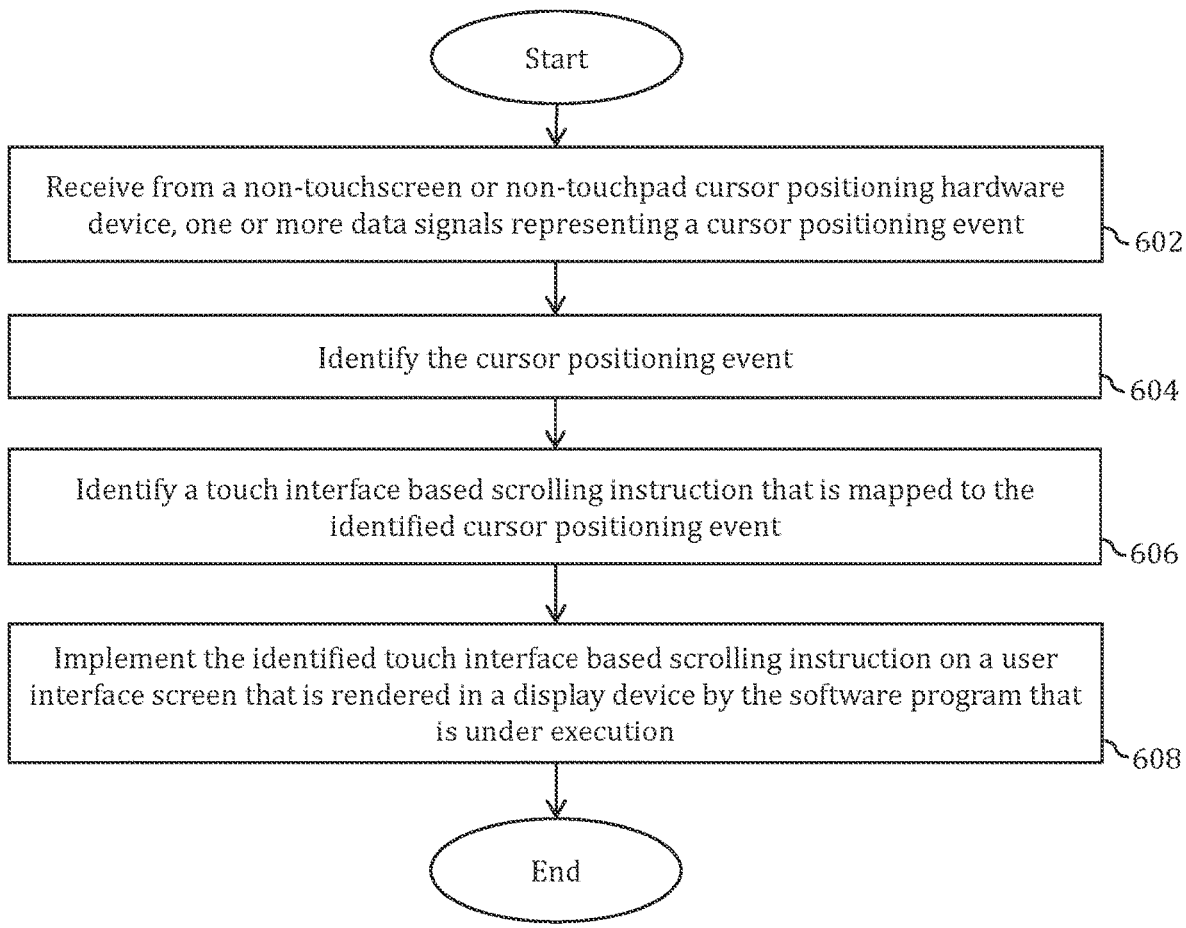

FIGS. 5 and 6 respectively illustrate method embodiments of the present invention.

Figure 7:
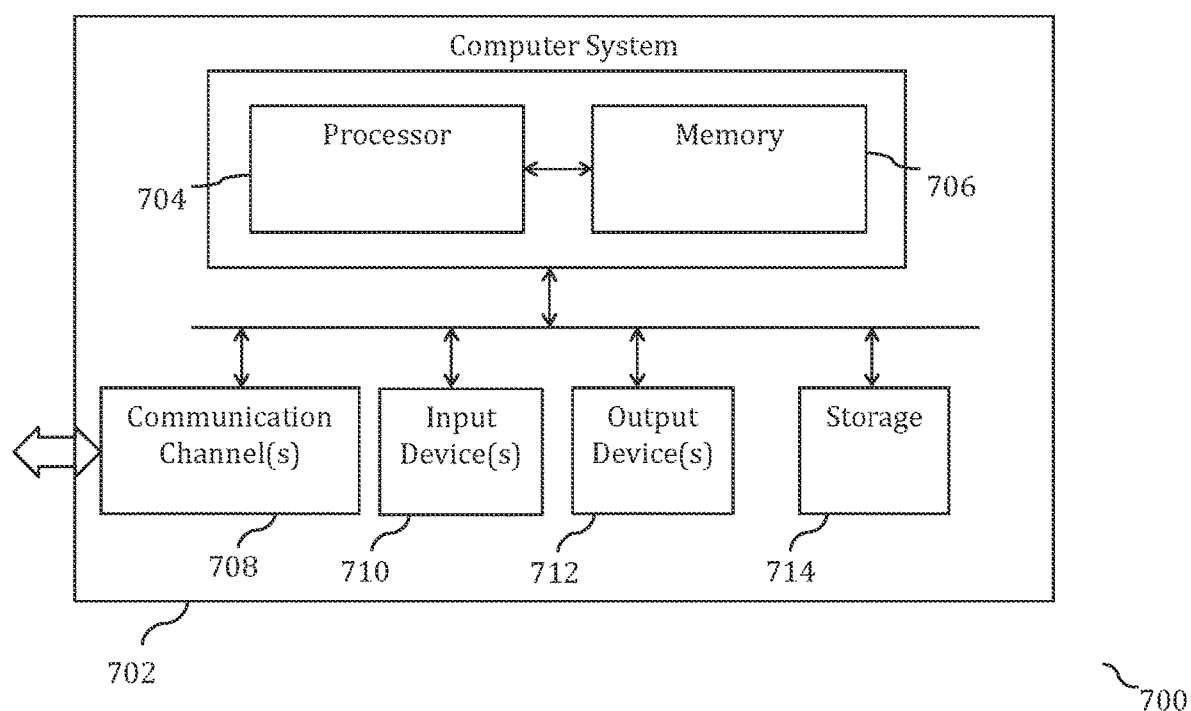

FIG. 7 illustrates an exemplary computing system of a type that may be used to implement the invention.

DETAILED DESCRIPTION

The present invention enables mapping of cursor positioning instructions received from one or more controllers or user interfaces communicatively coupled to a computing system or device on which a software application is being executed, to one or more scrolling instructions or events that the software application is configured to recognize.

For the purposes of the present written description and accompanying claims, the term "cursor" shall mean any visible indicator or navigation control indicator that can be displayed on a display device and that can be moved or positioned within a display or interface rendered on such display device.

In particular, the invention involves (i) detecting one or more cursor positioning events received through an input device, (ii) recognizing or determining that the detected cursor positioning event is mapped to a scrolling instruction associated with a software program that is under execution, and (iii) implementing the mapped scrolling instruction within the software program under execution.

In a specific embodiment, the invention involves (i) detecting a cursor positioning event that positions a displayed cursor at a predefined region on a user interface screen that has been rendered on a display by the software program under execution, (ii) identifying a scrolling instruction that is mapped to (or associated with) with the detected cursor positioning event, and (iii) implementing the identified scrolling instruction on the user interface screen that is rendered on the display by the software program under execution.

In a particular embodiment, cursor positioning events that position the displayed cursor within a predefined region located at a right side edge of the user interface screen that is rendered on a display by the software program under execution, are mapped to (or associated with) an instruction to scroll the user interface screen in a rightward direction. In this embodiment, positioning the cursor within the predefined region located at a right side edge of the user interface screen that is rendered on a display by the software program under execution would result in the user interface screen being scrolled in a rightward direction. The predefined region may in an embodiment comprise a band of positions or coordinates that fall within a predefined distance from the right edge of the user interface screen. In another embodiment, the predefined region may comprise a predefined right side boundary or a line at the right side of the user interface screen that is rendered on the display.

In a particular embodiment, cursor positioning events that position the displayed cursor within a predefined region located at a left side edge of the user interface screen that is rendered on a display by the software program under execution, are mapped to (or associated with) an instruction to scroll the user interface screen in a leftward direction. In this embodiment, positioning the cursor within the predefined region located at a left side edge of the user interface screen that is rendered on a display by the software program under execution would result in the user interface screen being scrolled in a leftward direction. The predefined region may in an embodiment comprise a band of positions or coordinates that fall within a predefined distance from the left edge of the user interface screen. In another embodiment, the predefined region may comprise a predefined left side boundary or a line at the left side of the user interface screen that is rendered on the display.

In a particular embodiment, cursor positioning events that position the displayed cursor within a predefined region located at a top edge of the user interface screen that is rendered on a display by the software program under execution, are mapped to (or associated with) an instruction to scroll the user interface screen in an upward direction. In this embodiment, positioning the cursor within the predefined region located at a top edge of the user interface screen that is rendered on a display by the software program under execution would result in the user interface screen being scrolled in an upward direction. The predefined region may in an embodiment comprise a band of positions or coordinates that fall within a predefined distance from the top edge of the user interface screen. In another embodiment, the predefined region may comprise a predefined upper edge boundary or a line at the upper side of the user interface screen that is rendered on the display.

In a particular embodiment, cursor positioning events that position the displayed cursor within a predefined region located at a bottom edge of the user interface screen that is rendered on a display by the software program under execution, are mapped to (or associated with) an instruction to scroll the user interface screen in a downward direction. In this embodiment, positioning the cursor within the predefined region located at a bottom edge of the user interface screen that is rendered on a display by the software program under execution would result in the user interface screen being scrolled in a downward direction. The predefined region may in an embodiment comprise a band of positions or coordinates that fall within a predefined distance from the bottom edge of the user interface screen. In another embodiment, the predefined region may comprise a predefined bottom edge boundary or a line at the lower side of the user interface screen that is rendered on the display.

Figure 1:
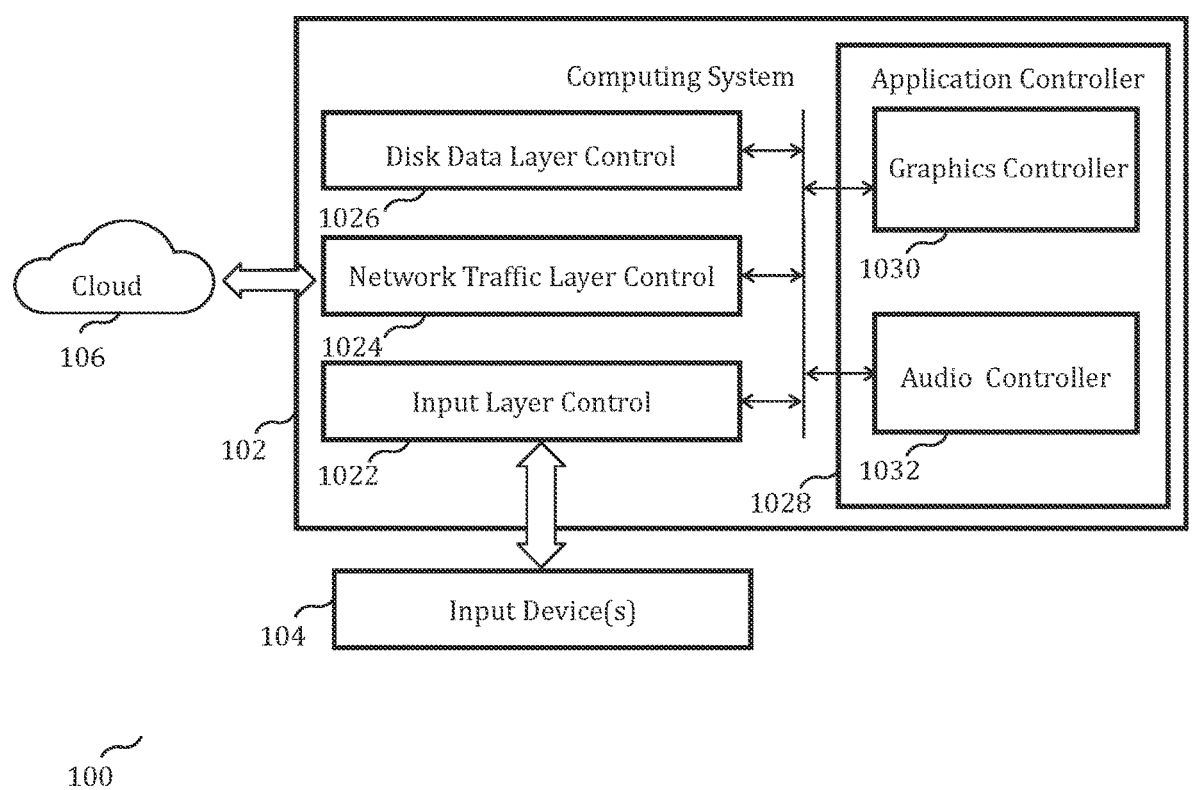
FIG. 1 illustrates an exemplary system environment for executing a software application.

The present invention may be implemented through a computing system of the type illustrated in FIG. 1 (briefly discussed above).

Figure 2:
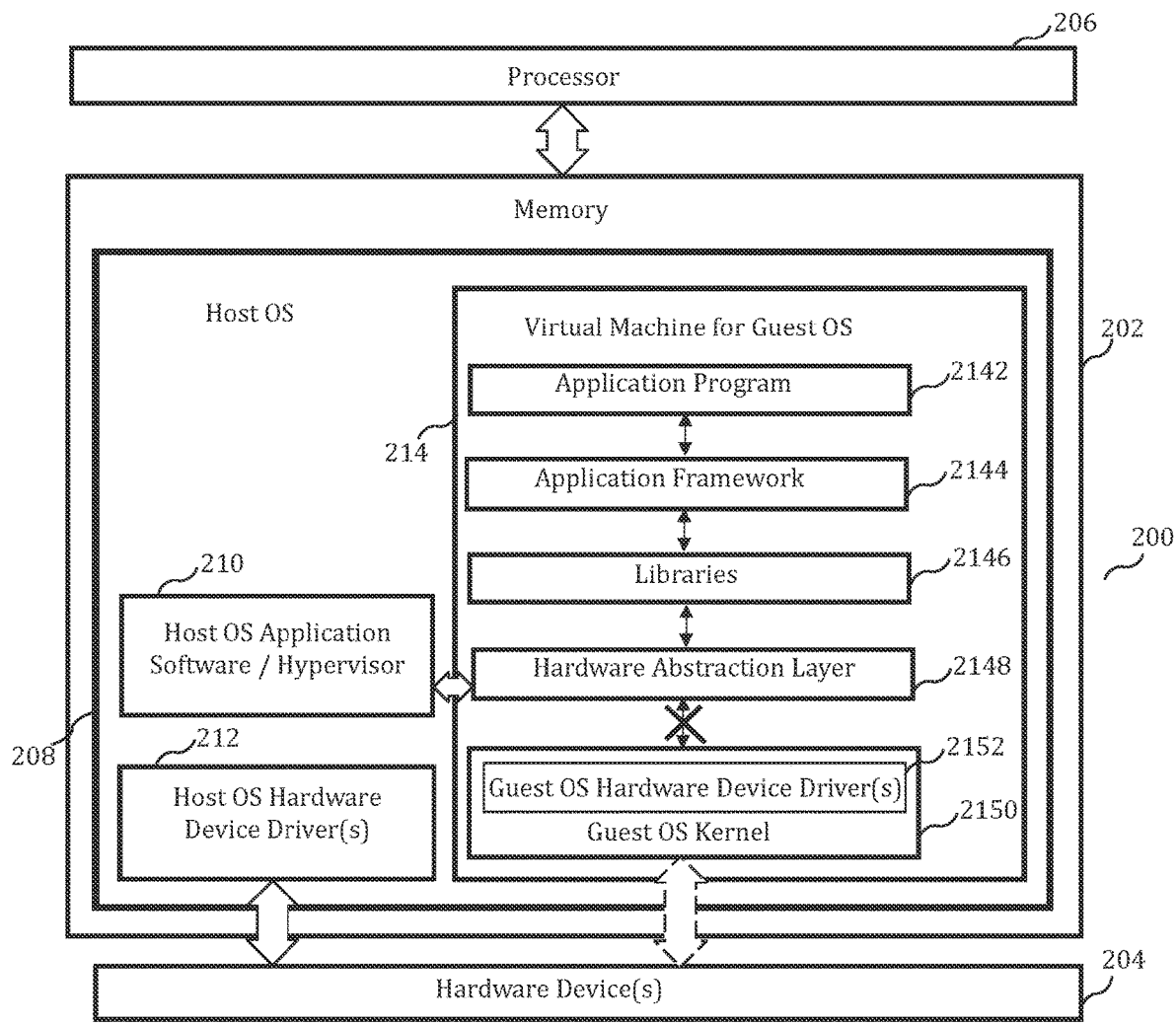
FIG. 2 illustrates an exemplary system for a computer implemented architecture configured for execution of application software that is written or compiled for runtime execution within a guest operating system inside of a host operating system.

In a more particular embodiment, the computing system that is used to implement or execute a software application in accordance with the teachings of the present disclosure may comprise a computer system architecture configured for execution of a virtual instance of a guest operating system within a host operating system running on the computer system architecture, and further configured to enable runtime execution of a software program written for the guest operating system, within the virtual instance of said guest operating system within the host operating system. FIG. 2 illustrates an exemplary embodiment of a computer system architecture 200 that includes a guest operating system architecture (for example, Android architecture) and a host operating system architecture (for example, a Windows/macOS architecture).

As illustrated in FIG. 2, computer system architecture 200 comprises a memory 202, one or more hardware devices 204, and one or more processors 206 communicatively coupled to each other. Memory 202 has loaded or stored therewithin a host operating system 208. The guest operating system implemented within the computer system architecture 200 is a virtual instance of an operating system that is launched by executing a host operating system software application 210 configured to emulate a hardware architecture capable of implementing the guest operating system—which host operating system software application 210 is alternatively referred to as a virtual software or a hypervisor. Executing the hypervisor creates an instance 214 of a virtual machine on which the guest operating system can be run in a manner that is transparent to the end user.

The generated instance of the guest operating system 214 may include a software stack including one or more of an application program layer 2142, an application framework layer 2144, a libraries layer 2146, a hardware abstraction layer (HAL) 2148, and a kernel layer 2150. The application program layer 2142 includes various software applications. The application framework layer 2144 is used by developers to access framework application programming interfaces (APIs) and manage the basic functions of a mobile device, laptop, or tablet on which the guest operating system is executed, such as resource allocation, switching between processes or programs, phone applications, and keeping track of the physical location of computing system (e.g. the executing phone/laptop/tablet). The application framework layer 2144 may include various managers, including an activity manager, a window manager, a content provider manager, a view system manager, a package manager, a telephony manager, a resource manager, a location manager, and a notification manager.

The library layer 2146 includes libraries written, e.g., in C, C++, etc., and is used by various systems. The libraries instruct the device executing the guest operating system on how to handle different kinds of data and are exposed to developers via the application framework. In an exemplary embodiment, where the guest operating system is Android, libraries may include, e.g., a surface manager, a media framework library, an SQLite library, an Open GL/ES library, a Free Type library, a WebKit library, an SGL library, an SSL library, and an libc library.

The hardware abstraction layer 2148 provides a standard way to create software hooks (code used to alter or augment the behaviour of an operating system, of applications, or of other software components by intercepting function calls or messages or events passed between software components) between the guest operating system platform stack and the underlying hardware. The hardware abstraction layer 2148 also acts as an abstraction layer between the hardware and the rest of the software stack.

Guest operating system kernel layer 2150 includes guest operating system memory management programs, security settings, power management software and several drivers, such as the device driver for hardware, file system access, networking, and inter-process-communication. In the illustrated embodiment, guest operating system kernel layer 2150 includes at least guest operating system hardware device drivers 2152.

Typically in operation, when an operating system such as the guest operating system is being run directly as a host operating system on a computing system, an instruction from the guest operating system software application to a hardware device 204 (for example an audio or display device) would be routed to a hardware device driver 2152 within the corresponding guest operating system kernel layer 2150—which driver would thereafter control the operation of the hardware device 204 based on the received instruction. However, in the illustration shown in FIG. 2, since the virtual instance of the guest operating system 214 is launched from within the host operating system 208, the virtual instance of the guest operating system 214 would be run within the host operating system 208 as a process or a plurality of processes. Any instruction generated by an application program being executed within application program layer 2142 of the virtual instance of the guest operating system 214, to access the hardware through the device drivers 2152 within guest operating system kernel 2150 would be inoperative/meaningless to the host operating system 208, because such access is outside of the scope of the host operating system 218. Thus, a request for data or an instruction from an application program being executed within virtual instance of the guest operating system 214 would not be sent from the hardware abstraction layers 2148 to the guest operating system kernel layer 2150 (as illustrated by the crossed out communication link in FIG. 2), since the guest operating system kernel's hardware device drivers 2152 would be unable to fulfil the request or instruction—which would in turn result in an unintended state of the hardware or in malfunctioning of the hardware.

Instead, such request or instruction would be routed from hardware abstraction layer 2152 within virtual instance of the guest operating system 214 to the host operating system application software 210 via one or more of the application framework layer 2144, the library layer 2146, the hardware abstraction layer 2148 and a data channel between the hardware abstraction layer 2148 and the host operating system application software 210 - which data channel is configured to enable a request or instruction from an application program that is being executed within virtual instance of the guest operating system 214, to be relayed to the host operating system application software 210.

The host operating system application software 210 is an application associated with the host operating system 208, which is executed by a host operating system processor through the host operating system 208. Through the host operating system application software, applications of the guest operating system are able to access the hardware and system data of the host operating system 208, including hardware devices 204 coupled with the host operating system processor and that are controlled through the host operating system.

The request or instruction received via the data channel is forwarded from the host operating system application software 210 to a hardware driver 212 controlled by host operating system 208. The hardware driver 212, in turn accesses the relevant hardware device 204 via a hardware abstraction layer of the host operating system (not shown). The hardware device data or a hardware device acknowledgement of a control instruction or a hardware device confirmation regarding execution of a control instruction, is read and sent back to the host operating system application software 210 via the hardware driver 212 controlled by the host operating system—and this hardware device data/acknowledgement of a control instruction/confirmation regarding execution of a control instruction, may in turn be routed to the application program that is being executed within virtual instance of the guest operating system 214 that requested the data or initiated the control instruction. Once the data/acknowledgement/confirmation is made available to the hardware abstraction layer 2148 of the guest operating system, the other higher level layers of said guest operating system, including the library layer 2146 and the application framework layer 2144 within the virtual machine would work as expected.

Figure 3:
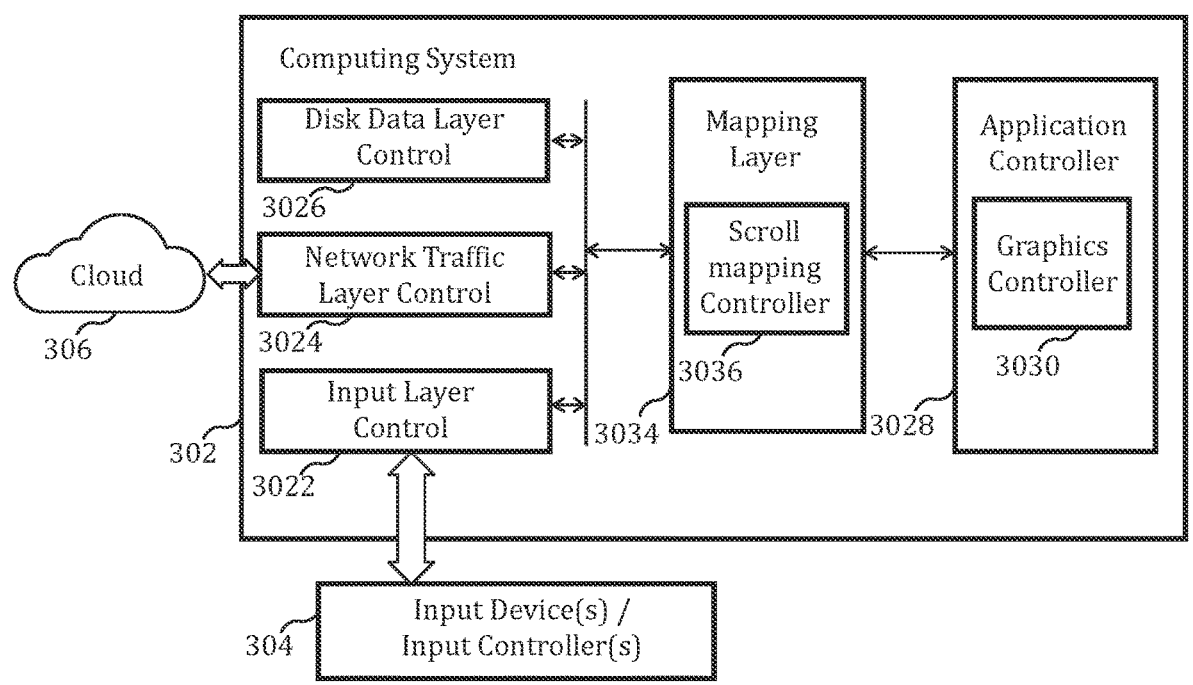
FIGS. 3 illustrates an exemplary system environment for executing a software application within computing systems configured to implement the present invention.

FIG. 3 illustrates an embodiment of a system environment 300 of the type that has been more generally discussed in connection with FIG. 1—and which has been specifically configured to implement the present invention. System environment 300 comprises computing system 302 communicably coupled with one or more input devices 304 (for example integrated or peripheral input devices such as a keyboard, a touch pad, a mouse, a game pad, a motion sensor/detector, a joystick or other form of input controller). Computing system 302 may additionally be in network communication with cloud 306 (which cloud 306 may comprise any internetwork, network backend or network backbone, such as the internet).

Computing system 302 is configured to implement or execute a desired software application—for example a game software application. In the illustrated embodiment, computing system 302 comprises (i) input layer controller 3022 configured to interface with one or more input devices 304 and to receive user inputs, (ii) network traffic layer controller 3024 configured to serve as an interface between the computing system and a network (for example the internet) and to enable receiving and sending of network communications at and from the computing system (iii) disk data layer controller 3026 configured to handle data stored on a disk (or on other non-transient storage) associated with the computing system, and (iv) application controller 3028 configured to execute and control the software application based on software code corresponding to the software application, and/or based on data received from one or more of input layer controller 3022, network traffic layer controller 3024 and disk data layer controller 3026—and which application controller 3028 further includes (a) graphics controller 3030 configured to translate software application program instructions to machine level instructions capable of being interpreted and implemented by a display controller coupled to the computing system 302, and (b) audio controller 3032 configured to translate software application program instructions to machine level instructions capable of being interpreted and implemented by an audio controller coupled to the computing system 302.

The computing system 302 may be communicatively coupled with one or more input devices/input controllers 304, which may variously include one or more of a keyboard, a mouse, or any other input device or game controller including without limitation, a game pad, paddle, joystick, trackball, throttle quadrant, directional controller, touch pad, directional pad or motion sensor based controller.

In addition to the above, it will be noted that the computing system 302 of system environment 300 includes a mapping layer 3034 that may be configured as a communication intermediate layer or as a gateway layer that is communicably interposed between (i) application controller 3028, or graphics controller 3030 on the one side, and (ii) one or more of input device(s) 304, input layer controller 3022, network traffic layer controller 3024, disk data layer controller 3026 and cloud 306 on the other side.

Mapping layer 3034 comprises scroll mapping controller 3036—the functionality of which is described in more detail below.

The scroll mapping controller 3036 within mapping layer 3034 is, in an embodiment, configured to translate cursor positioning inputs received from one or more input devices 304 to scrolling instructions or scrolling events capable of being detected and interpreted by a software application/game application being executed on the computing system 302. For example, in a game application being executed at a computing system, scroll mapping controller 3036 may be configured to translate inputs received through cursor positioning events on a keyboard or mouse or other input device into scroll actions that require to be generated by input through a touch pad or touch screen (for example touch based swipe inputs for scrolling up, down, left or right).

In an embodiment of the invention, the scroll mapping controller may be configured to translate cursor positioning inputs received from one or more input devices 304 to instructions or events capable of being detected and interpreted by a software application/game application being executed on the computing system 302, based on one or more lookup tables, or one or more substitution tables, or based on any other data records that enable correlation of cursor positioning inputs received from one or more input devices 304 with instructions or events capable of being detected and interpreted by a software application/game application being executed on the computing system 302.

In particular, the mapping layer 3034 or the scroll mapping controller 3036 may be configured for any of (i) detecting one or more cursor positioning events received through an input device, (ii) recognizing or determining that the detected cursor positioning event is mapped to a scrolling instruction associated with a software program that is under execution, and (iii) implementing the mapped scrolling instruction within the software program under execution.

In a specific embodiment, the mapping layer 3034 or the scroll mapping controller 3036 may be configured for any of (i) detecting a cursor positioning event that positions a displayed cursor at a predefined region on a user interface screen that is rendered on a display by the software program under execution, (ii) identifying a scrolling instruction that is mapped to (or associated with) with the detected cursor positioning event, and (iii) implementing the identified scrolling instruction on the user interface screen that is rendered in the display by the software program under execution.

In a particular embodiment, the mapping layer 3034 or the scroll mapping controller 3036 may be configured such that cursor positioning events that position the displayed cursor within a predefined region located at a right side edge of the user interface screen that is rendered on a display by the software program under execution, are mapped to (or associated with) an instruction to scroll the user interface screen in a rightward direction. In this embodiment, positioning the cursor within the predefined region located at a right side edge of the user interface screen that is rendered on a display by the software program under execution would result in the user interface screen being scrolled in a rightward direction. The predefined region may in an embodiment comprise a band of positions or coordinates that fall within a predefined distance from the right edge of the user interface screen. In another embodiment, the predefined region may comprise a predefined right edge boundary or a line at the right side of the user interface screen that is rendered on the display.

In a particular embodiment, the mapping layer 3034 or the scroll mapping controller 3036 may be configured such that cursor positioning events that position the displayed cursor within a predefined region located at a left side edge of the user interface screen that is rendered on a display by the software program under execution, are mapped to (or associated with) an instruction to scroll the user interface screen in a leftward direction. In this embodiment, positioning the cursor within the predefined region located at a left side edge of the user interface screen that is rendered on a display by the software program under execution would result in the user interface screen being scrolled in a leftward direction. The predefined region may in an embodiment comprise a band of positions or coordinates that fall within a predefined distance from the left edge of the user interface screen. In another embodiment, the predefined region may comprise a predefined left edge boundary or a line at the left side of the user interface screen that is rendered on the display.

In a particular embodiment, the mapping layer 3034 or the scroll mapping controller 3036 may be configured such that cursor positioning events that position the displayed cursor within a predefined region located at a top edge of the user interface screen that is rendered on a display by the software program under execution, are mapped to (or associated with) an instruction to scroll the user interface screen in an upward direction. In this embodiment, positioning the cursor within the predefined region located at a top edge of the user interface screen that is rendered on a display by the software program under execution would result in the user interface screen being scrolled in an upward direction. The predefined region may in an embodiment comprise a band of positions or coordinates that fall within a predefined distance from the top edge of the user interface screen. In another embodiment, the predefined region may comprise a predefined upper edge boundary or a line at the upper side of the user interface screen that is rendered on the display.

In a particular embodiment, the mapping layer 3034 or the scroll mapping controller 3036 may be configured such that cursor positioning events that position the displayed cursor within a predefined region located at a bottom edge of the user interface screen that is rendered on a display by the software program under execution, are mapped to (or associated with) an instruction to scroll the user interface screen in a downward direction. In this embodiment, positioning the cursor within the predefined region located at a bottom edge of the user interface screen that is rendered on a display by the software program under execution would result in the user interface screen being scrolled in a downward direction. The predefined region may in an embodiment comprise a band of positions or coordinates that fall within a predefined distance from the bottom edge of the user interface screen. In another embodiment, the predefined region may comprise a predefined lower edge boundary or a line at the lower side of the user interface screen that is rendered on the display.

In an embodiment of the invention, the invention may be implemented within a computing system having an architecture of the type illustrated in FIG. 2 (i.e. a computer implemented architecture that enables execution of application software that is configured for execution on an instance of a guest operating system that has been instantiated within a host operating system). In various such embodiments, the mapping layer 3034 or the scroll mapping controller 3036 may be configured to (i) detect cursor positioning events at a predefined region on a user interface screen that is rendered on a display by the software program under execution, wherein the cursor positioning event comprises receiving input from an input controller other than a touchscreen or a touchpad, (ii) identify a touch interface based scrolling instruction that is mapped to (or associated with) the detected cursor positioning event, and (iii) implementing the identified scrolling instruction on the user interface screen that is rendered in the display by the software program under execution, by sending to the software application a translated instruction to trigger a scrolling event—wherein the translated instruction is an instruction having parameters that are consistent with an instruction protocol set associated with a touchscreen or touchpad. In more specific embodiments:

- cursor positioning events (received through a non-touchscreen/non-touchpad input controller) that position the displayed cursor within a predefined region located at a right side edge of the user interface screen that is rendered on a display by the software program under execution, are mapped to (or associated with) a touchscreen or touchpad generated instruction to scroll the user interface screen in a rightward direction. In this embodiment, positioning the cursor within the predefined region located at a right side edge of the user interface screen that is rendered on a display by the software program under execution would result in a "right swipe" instruction being sent to the software program, and the user interface screen would be scrolled in a rightward direction. The predefined region may in an embodiment comprise a band of positions or coordinates that fall within a predefined distance from the right edge of the user interface screen. In another embodiment, the predefined region may comprise a predefined right edge boundary or a line at the right side of the user interface screen that is rendered on the display.
- cursor positioning events (received through a non-touchscreen/non-touchpad input controller) that position the displayed cursor within a predefined region located at a left side edge of the user interface screen that is rendered on a display by the software program under execution, are mapped to (or associated with) a touchscreen or touchpad generated instruction to scroll the user interface screen in a leftward direction. In this embodiment, positioning the cursor within the predefined region located at a left side edge of the user interface screen that is rendered on a display by the software program under execution would result in a "left swipe" instruction being sent to the software program, and the user interface screen would be scrolled in a leftward direction. The predefined region may in an embodiment comprise a band of positions or coordinates that fall within a predefined distance from the left edge of the user interface screen. In another embodiment, the predefined region may comprise a predefined left edge boundary or a line at the left side of the user interface screen that is rendered on the display.
- cursor positioning events (received through a non-touchscreen/non-touchpad input controller) that position the displayed cursor within a predefined region located at a top edge of the user interface screen that is rendered on a display by the software program under execution, are mapped to (or associated with) a touchscreen or touchpad generated instruction to scroll the user interface screen in an upward direction. In this embodiment, positioning the cursor within the predefined region located at a top edge of the user interface screen that is rendered on a display by the software program under execution would result in an "upward swipe" instruction being sent to the software program, and the user interface screen would be scrolled in an upward direction. The predefined region may in an embodiment comprise a band of positions or coordinates that fall within a predefined distance from the top edge of the user interface screen. In another embodiment, the predefined region may comprise a predefined upper edge boundary or a line at the upper side of the user interface screen that is rendered on the display.
- cursor positioning events (received through a non-touchscreen/non-touchpad input controller) that position the displayed cursor within a predefined region located at a bottom edge of the user interface screen that is rendered on a display by the software program under execution, are mapped to (or associated with) a touchscreen or touchpad generated instruction to scroll the user interface screen in a downward direction. In this embodiment, positioning the cursor within the predefined region located at a right side edge of the user interface screen that is rendered on a display by the software program under execution would result in a "downward swipe" instruction being sent to the software program, and the user interface screen would be scrolled in a downward direction. The predefined region may in an embodiment comprise a band of positions or coordinates that fall within a predefined distance from the bottom edge of the user interface screen. In another embodiment, the predefined region may comprise a predefined lower edge boundary or a line at the lower side of the user interface screen that is rendered on the display.

Figure 4:
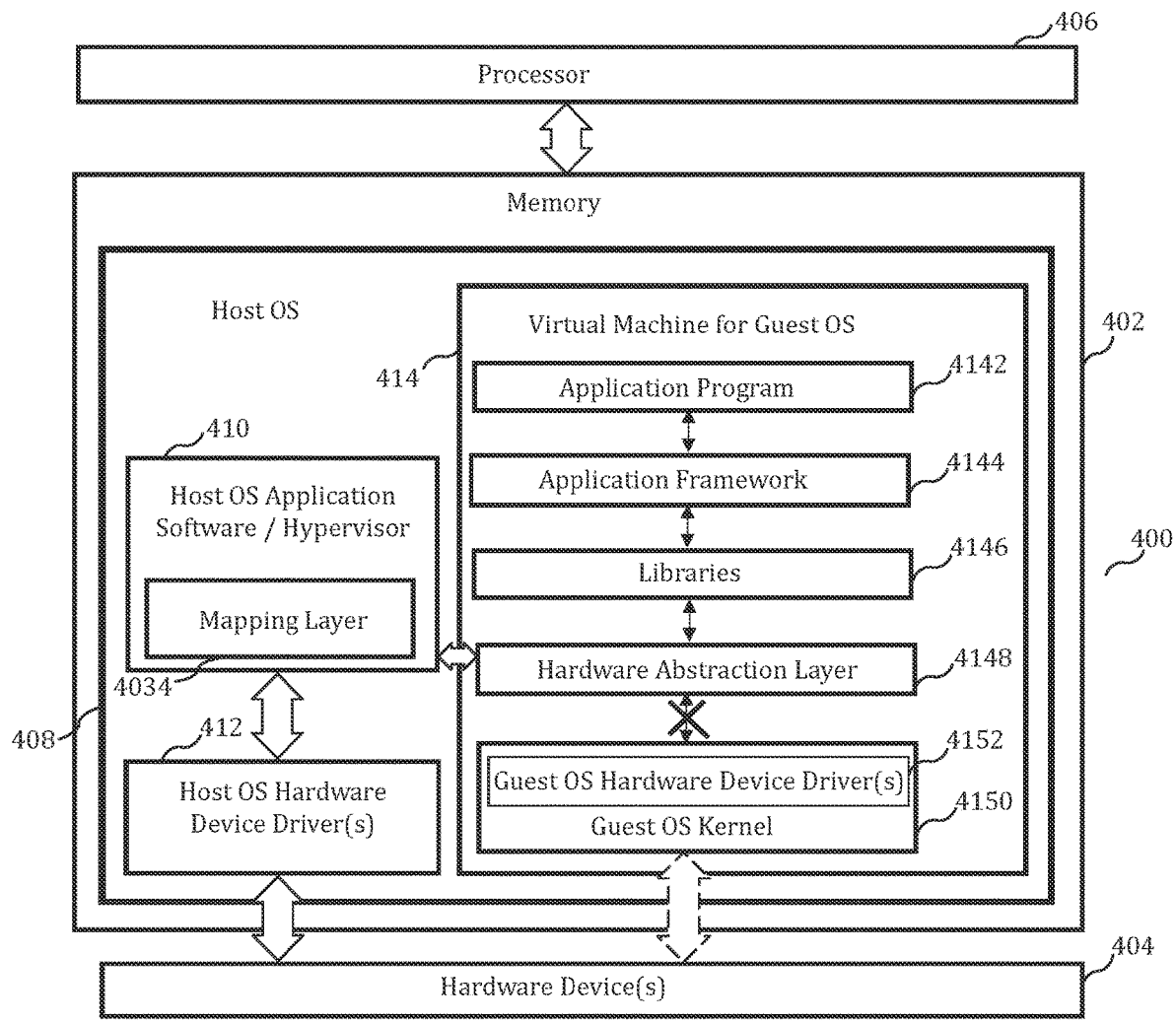
FIG. 4 illustrates an exemplary system for a computer implemented architecture configured for execution of application software that is written or compiled for runtime execution within a guest operating system inside of a host operating system—within which the present invention may be implemented or performed.

FIG. 4 illustrates an exemplary embodiment of a computer system architecture 400 (of a type previously described in connection with FIG. 2) that includes a guest operating system architecture (for example, Android architecture) and a host operating system architecture (for example, a Windows/macOS architecture).

As illustrated in FIG. 4, computer system architecture 400 comprises a memory 402, one or more hardware devices 404, and one or more processors 406 communicatively coupled to each other. Memory 402 has loaded or stored therewithin a host operating system 408. The guest operating system implemented within the computer system architecture 400 is a virtual instance of an operating system that is launched by executing a host operating system software application 410 configured to emulate a hardware architecture capable of implementing the guest operating system—which host operating system software application 410 is alternatively referred to as a virtual software or a hypervisor. Executing the hypervisor creates an instance 414 of a virtual machine on which the guest operating system can be run in a manner that is transparent to the end user.

The generated instance of the guest operating system 414 may include a software stack including one or more of an application program layer 4142, an application framework layer 4144, a libraries layer 4146, a hardware abstraction layer (HAL) 4148, and a kernel layer 4150. The application program layer 4142 includes various software applications. The application framework layer 4144 is used by developers to access framework application programming interfaces (APIs) and manage the basic functions of a mobile device, laptop, or tablet on which the guest operating system is executed, such as resource allocation, switching between processes or programs, phone applications, and keeping track of the physical location of computing system (e.g. the executing phone/laptop/tablet). The application framework layer 4144 may include various managers, including an activity manager, a window manager, a content provider manager, a view system manager, a package manager, a telephony manager, a resource manager, a location manager, and a notification manager.

The library layer 4146 includes libraries written, e.g., in C, C++, etc., and is used by various systems. The libraries instruct the device executing the guest operating system on how to handle different kinds of data and are exposed to developers via the application framework. In an exemplary embodiment, where the guest operating system is Android, libraries may include, e.g., a surface manager, a media framework library, an SQLite library, an Open GL/ES library, a Free Type library, a WebKit library, an SGL library, an SSL library, and an libc library.

The hardware abstraction layer 4148 provides a standard way to create software hooks (code used to alter or augment the behaviour of an operating system, of applications, or of other software components by intercepting function calls or messages or events passed between software components) between the guest operating system platform stack and the underlying hardware. The hardware abstraction layer 4148 also acts as an abstraction layer between the hardware and the rest of the software stack.

Guest operating system kernel layer 4150 includes guest operating system memory management programs, security settings, power management software and several drivers, such as the device driver for hardware, file system access, networking, and inter-process-communication. In the illustrated embodiment, guest operating system kernel layer 4150 includes at least guest operating system hardware device drivers 4152.

Typically in operation, when an operating system such as the guest operating system is being run directly as a host operating system on a computing system, an instruction from the guest operating system software application to a hardware device 404 (for example an audio or display device) would be routed to a hardware device driver 4152 within the corresponding guest operating system kernel layer 4150—which driver would thereafter control the operation of the hardware device 404 based on the received instruction. However, in the illustration shown in FIG. 4, since the virtual instance of the guest operating system 414 is launched from within the host operating system 408, the virtual instance of the guest operating system 414 would be run within the host operating system 408 as a process or a plurality of processes. Any instruction generated by an application program being executed within application program layer 4142 of the virtual instance of the guest operating system 414, to access the hardware through the device drivers 4152 within guest operating system kernel 4150 would be inoperative/meaningless to the host operating system 408, because such access is outside of the scope of the host operating system 418. Thus, a request for data or an instruction from an application program being executed within virtual instance of the guest operating system 414 would not be sent from the hardware abstraction layers 4148 to the guest operating system kernel layer 4150 (as illustrated by the crossed out communication link in FIG. 4), since the guest operating system kernel's hardware device drivers 4152 would be unable to fulfil the request or instruction—which would in turn result in an unintended state of the hardware or in malfunctioning of the hardware.

Instead, such request or instruction would be routed from hardware abstraction layer 4152 within virtual instance of the guest operating system 414 to the host operating system application software 410 via one or more of the application framework layer 4144, the library layer 4146, the hardware abstraction layer 4148 and a data channel between the hardware abstraction layer 4148 and the host operating system application software 410—which data channel is configured to enable a request or instruction from an application program that is being executed within virtual instance of the guest operating system 414, to be relayed to the host operating system application software 410.

The host operating system application software 410 is an application associated with the host operating system 408, which is executed by a host operating system processor through the host operating system 408. Through the host operating system application software, applications of the guest operating system are able to access the hardware and system data of the host operating system 408, including hardware devices 404 coupled with the host operating system processor and that are controlled through the host operating system.

The request or instruction received via the data channel is forwarded from the host operating system application software 410 to a hardware driver 412 controlled by host operating system 408. The hardware driver 412, in turn accesses the relevant hardware device 404 via a hardware abstraction layer of the host operating system (not shown). The hardware device data or a hardware device acknowledgement of a control instruction or a hardware device confirmation regarding execution of a control instruction, is read and sent back to the host operating system application software 410 via the hardware driver 412 controlled by the host operating system—and this hardware device data/acknowledgement of a control instruction/confirmation regarding execution of a control instruction, may in turn be routed to the application program that is being executed within virtual instance of the guest operating system 414 that requested the data or initiated the control instruction. Once the data/acknowledgement/confirmation is made available to the hardware abstraction layer 4148 of the guest operating system, the other higher level layers of said guest operating system, including the library layer 4146 and the application framework layer 4144 within the virtual machine would work as expected.

The system 400 illustrated in FIG. 4 may include a mapping layer 4034 of a type previously described in connection with FIG. 3.

Mapping layer 4034 that may be configured as a communication intermediate layer or as a gateway layer that is communicably interposed between (i) the Host OS Hardware Device Driver(s) 412 and (ii) the Application Program 4142 that is being run or implemented within the Virtual Machine for Guest OS 414. In a particular embodiment that is shown in FIG. 4, mapping layer 4034 may be implemented within Host OS Application Software/Hypervisor 410.

Mapping layer 4034 may include a scroll mapping controller (for example scroll mapping controller 3036 of FIG. 3)—the functionality of which is described in more detail below.

The scroll mapping controller within mapping layer 4034 is, in an embodiment, configured to translate cursor positioning inputs received from one or more hardware devices 404 to scrolling instructions or scrolling events capable of being detected and interpreted by a software application/game application 4142 being executed within a Virtual Machine for Guest OS 414. For example, in a game application being executed within a virtual machine for the Android OS, the scroll mapping controller may be configured to translate inputs received through cursor positioning events on a keyboard or mouse or other input device into scroll actions that require to be generated by input through a touch pad or touch screen (for example touch based swipe inputs for scrolling up, down, left or right).

In an embodiment of the invention, the scroll mapping controller may be configured to translate cursor positioning inputs received from one or more hardware devices 404 to instructions or events capable of being detected and interpreted by a software application/game application 4142 being executed within the Virtual Machine for Guest OS 414, based on one or more lookup tables, or one or more substitution tables, or based on any other data records that enable correlation of cursor positioning inputs received from one or more hardware devices 404 with instructions or events capable of being detected and interpreted by a software application/game application being executed on the computing system 402.

In particular, the mapping layer 4034 or the scroll mapping controller therewithin may be configured for any of (i) detecting one or more cursor positioning events received through a hardware device, (ii) recognizing or determining that the detected cursor positioning event is mapped to a scrolling instruction associated with a software program that is under execution, and (iii) implementing the mapped scrolling instruction within the software program under execution.

In a specific embodiment, the mapping layer 4034 or the scroll mapping controller therewithin may be configured for any of (i) detecting a cursor positioning event that positions a displayed cursor at a predefined region on a user interface screen that is rendered on a display by the application program 4142 under execution, (ii) identifying a scrolling instruction that is mapped to (or associated with) with the detected cursor positioning event, and (iii) implementing the identified scrolling instruction on the user interface screen that is rendered in the display by the application program 4142 under execution.

In a particular embodiment, the mapping layer 4034 or the scroll mapping controller therewithin may be configured such that cursor positioning events that position the displayed cursor within a predefined region located at a right side edge of the user interface screen that is rendered on a display by the application program 4142 under execution, are mapped to (or associated with) an instruction to scroll the user interface screen in a rightward direction. In this embodiment, positioning the cursor within the predefined region located at a right side edge of the user interface screen that is rendered on a display by the application program 4142 under execution would result in the user interface screen being scrolled in a rightward direction. The predefined region may in an embodiment comprise a band of positions or coordinates that fall within a predefined distance from the right edge of the user interface screen. In another embodiment, the predefined region may comprise a predefined right edge boundary or a line at the right side of the user interface screen that is rendered on the display.

In a particular embodiment, the mapping layer 4034 or the scroll mapping controller therewithin may be configured such that cursor positioning events that position the displayed cursor within a predefined region located at a left side edge of the user interface screen that is rendered on a display by the application program 4142 under execution, are mapped to (or associated with) an instruction to scroll the user interface screen in a leftward direction. In this embodiment, positioning the cursor within the predefined region located at a left side edge of the user interface screen that is rendered on a display by the application program 4142 under execution would result in the user interface screen being scrolled in a leftward direction. The predefined region may in an embodiment comprise a band of positions or coordinates that fall within a predefined distance from the left edge of the user interface screen. In another embodiment, the predefined region may comprise a predefined left edge boundary or a line at the left side of the user interface screen that is rendered on the display.

In a particular embodiment, the mapping layer 4034 or the scroll mapping controller therewithin may be configured such that cursor positioning events that position the displayed cursor within a predefined region located at a top edge of the user interface screen that is rendered on a display by the application program 4142 under execution within the Virtual Machine for Guest OS 414, are mapped to (or associated with) an instruction to scroll the user interface screen in an upward direction. In this embodiment, positioning the cursor within the predefined region located at a top edge of the user interface screen that is rendered on a display by the application program 4142 under execution within the Virtual Machine for Guest OS 414, would result in the user interface screen being scrolled in an upward direction. The predefined region may in an embodiment comprise a band of positions or coordinates that fall within a predefined distance from the top edge of the user interface screen. In another embodiment, the predefined region may comprise a predefined upper edge boundary or a line at the upper side of the user interface screen that is rendered on the display.

In a particular embodiment, the mapping layer 4034 or the scroll mapping controller 3036 may be configured such that cursor positioning events that position the displayed cursor within a predefined region located at a bottom edge of the user interface screen that is rendered on a display by the application program 4142 under execution within the Virtual Machine for Guest OS 414, are mapped to (or associated with) an instruction to scroll the user interface screen in a downward direction. In this embodiment, positioning the cursor within the predefined region located at a bottom edge of the user interface screen that is rendered on a display by the application program 4142 under execution within the Virtual Machine for Guest OS 414, would result in the user interface screen being scrolled in a downward direction. The predefined region may in an embodiment comprise a band of positions or coordinates that fall within a predefined distance from the bottom edge of the user interface screen. In another embodiment, the predefined region may comprise a predefined lower edge boundary or a line at the lower side of the user interface screen that is rendered on the display.

FIG. 5 illustrates a first method embodiment of the present invention. In an embodiment, the method of FIG. 5 may be implemented at a processor implemented mapping layer 4034 within system 400 of FIG. 4. In a more specific embodiment, the method of FIG. 5 may be implemented within a scroll mapping controller that is implemented within mapping layer 4034.

Step 502 comprises receiving from a cursor positioning hardware device, one or more data signals representing a cursor positioning event.

Step 504 comprises identifying the cursor positioning event. In an embodiment, the cursor positioning event may be identified by parsing, analyzing or interpreting the received one or more data signals or data that is encoded within the one or more data signals. In an embodiment, identifying the cursor positioning event comprises identifying a position on a display or display interface at which a cursor requires to be displayed or positioned or moved to.

At step 506, responsive to determining that the identified cursor positioning event is mapped to a scrolling instruction associated with a software program that is under execution, the mapped scrolling instruction is implemented within a software program/application software that is under execution. In various embodiments, step 506 may include implementation of any one or more steps or functionalities that have been described above in connection with mapping layer 3034, mapping layer 4034 and/or scroll mapping controller 3036.

FIG. 6 illustrates a second method embodiment of the present invention. The method of FIG. 6 may be implemented within a processor implemented mapping layer 4034 within system 400 of FIG. 4. In a more specific embodiment, the method of FIG. 6 may be implemented within a scroll mapping controller that is implemented within mapping layer 4034.

Step 602 comprises receiving from a non-touchscreen or non-touchpad cursor positioning hardware device, one or more data signals representing a cursor positioning event. In another embodiment, step 602 comprises receiving one or more data signals representing a cursor positioning event from a cursor positioning (or cursor controlling) hardware device that is neither a touchpad nor a touchscreen. For example, the cursor positioning device may comprise any of a mouse, joystick, trackball, pointing device, gaming controller or other connectable input device, camera, microphone, earphones or buds with input functionality—but not including a touchpad or touchscreen or other device that relies on touch based sensing. In an embodiment, the cursor positioning hardware device is configured to control positioning of a cursor independent of user input from any of a touchpad or touchscreen or touch sensor.

Step 604 comprises identifying the cursor positioning event represented by the one or more data signals. In an embodiment, the cursor positioning event may be identified by parsing, analyzing or interpreting the received one or more data signals or data that is encoded within the one or more data signals. The cursor positioning event of step 604 is an event that involves or comprises receiving input from an input controller other than a touchscreen or a touch pad. In an embodiment, identifying the cursor positioning event comprises identifying a position on a display or display interface at which a cursor requires to be displayed or positioned or moved to.

Step 606 comprises identifying a touch interface based scrolling instruction, or a touch sensor triggered scrolling instruction, that is mapped to the identified cursor positioning event.

Step 608 comprises implementing the identified touch interface based scrolling instruction on a user interface screen that is rendered in a display device by the software program that is under execution. It will be understood that in the method of FIG. 6, the software program that is under execution is a software program being executed within an Android OS. In a particular embodiment, the Android OS is implemented within a virtual machine configured to run the Android OS, and the virtual machine is being implemented within a host OS (that is different from the Android OS) through a Host OS Application Software/Hypervisor (for example, Host OS Application Software/Hypervisor 410 from FIG. 4).

In various embodiments, step 608 may include implementation of any one or more steps or functionalities that have been described above in connection with mapping layer 3034, mapping layer 4034 and/or scroll mapping controller 3036.

FIG. 7 illustrates an exemplary computer system 702 for implementing the present invention.

The illustrated system comprises computer system 702 which in turn comprises one or more processors 704 and at least one memory 706. Processor 704 is configured to execute program instructions—and may be a real processor or a virtual processor. It will be understood that computer system 702 does not suggest any limitation as to scope of use or functionality of described embodiments. The computer system 702 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 702 in accordance with the present invention may include one or more servers, desktops, laptops, tablets, smart phones, mobile phones, mobile communication devices, tablets, phablets and personal digital assistants. In an embodiment of the present invention, the memory 706 may store software for implementing various embodiments of the present invention. The computer system 702 may have additional components. For example, the computer system 702 may include one or more communication channels 708, one or more input devices 710, one or more output devices 712, and storage 714. An interconnection mechanism (not shown) such as a bus, controller, or network, interconnects the components of the computer system 702. In various embodiments of the present invention, operating system software (not shown) provides an operating environment for various softwares executing in the computer system 702 using a processor 704, and manages different functionalities of the components of the computer system 702.

The communication channel(s) 708 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 710 may include, but is not limited to, a touch screen, a keyboard, mouse, pen, joystick, trackball, a voice device, a scanning device, or any another device that is capable of providing input to the computer system 702. In an embodiment of the present invention, the input device(s) 710 may be a sound card or similar device that accepts audio input in analog or digital form. The output device(s) 712 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 702.

The storage 714 may include, but not be limited to, magnetic disks, magnetic tapes, CD-ROMs, CD -RWs, DVDs, any types of computer memory, magnetic stripes, smart cards, printed barcodes or any other transitory or non-transitory medium which can be used to store information and can be accessed by the computer system 702. In various embodiments of the present invention, the storage 714 may contain program instructions for implementing any of the described embodiments.

In an embodiment of the present invention, the computer system 702 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 702. The method described herein is typically implemented as a computer program product, comprising a set of program instructions that is executed by the computer system 702 or any other similar device. The set of program instructions may be a series of computer readable codes stored on a tangible medium, such as a computer readable storage medium (storage 714), for example, diskette, CD-ROM, ROM, flash drives or hard disk, or transmittable to the computer system 702, via a modem or other interface device, over either a tangible medium, including but not limited to optical or analogue communications channel(s) 708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The present invention accordingly provides effective solutions to map non-touchscreen or non-touchpad based cursor positioning inputs received from one or more controllers or user interfaces communicatively coupled to a computing device on which a software application is being executed, to one or more touchscreen or touchpad based scrolling instructions or events that said software application is configured to recognize.

While the exemplary embodiments of the present invention are described and illustrated herein, it will be appreciated that they are merely illustrative. It will be understood by those skilled in the art that various modifications in form and detail may be made therein without departing from or offending the scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

We claim:

1. A method for implementing scrolling within a display, the method comprising implementing at a processor of a computing device, the steps of:
    executing a virtual instance of a guest operating system within a host operating system that is implemented on a computing system, wherein:
        the guest operating system is different from the host operating system; and
        a guest operating system application program is executed within the virtual instance of the guest operating system;
        the virtual instance of the guest operating system is launched by a host operating system software application that is configured to emulate a hardware architecture capable of implementing the guest operating system; and
        the host operating system software application has implemented therewithin, a mapping layer comprising a scroll mapping controller, wherein the mapping layer is communicably interposed between one or more host operating system hardware device drivers and the guest operating system application program;
    receiving at the scroll mapping controller, from a non-touch cursor positioning hardware device, one or more data signals representing a cursor positioning event, wherein the non-touch cursor positioning hardware device is a device other than a touchscreen or touchpad;
    identifying the cursor positioning event; and
    responsive to determining:
        (i) that the identified cursor positioning event results in positioning of a displayed cursor within a predefined region of a user interface screen that is rendered on the display by the guest operating system application program that is being executed within the virtual instance of the guest operating system, and
        (ii) that positioning of the displayed cursor within the predefined region of the user interface screen is mapped to a scrolling instruction associated with the guest operating system application program that is being executed within the virtual instance of the guest operating system,
    implementing the scrolling instruction within the user interface screen that is rendered by the guest operating system application program that is being executed within the virtual instance of the guest operating system, wherein implementing the scrolling instruction does not require detection of any event other than positioning of the displayed cursor within the predefined region of a user interface screen;
    wherein:
        implementing the scrolling instruction within the user interface screen comprises generating through the scroll mapping controller, a translated instruction to trigger a scrolling event within the user interface screen that is rendered by the guest operating system application program that is being executed within the virtual instance of the guest operating system, wherein the translated instruction has parameters that are consistent with an instruction protocol set associated with a touchscreen or touchpad.

2. The method as claimed in claim 1, wherein identifying the cursor positioning event comprises identifying a position on a display or display interface at which a cursor requires to be displayed, positioned or moved to.

3. The method as claimed in claim 1, wherein the non-touch cursor positioning hardware device is not a touch sensor based cursor positioning hardware device.

4. The method as claimed in claim 1, wherein the non-touch cursor positioning hardware device is configured to control positioning of a cursor independent of user input from any of a touchpad or touchscreen or touch sensor.

5. The method as claimed in claim 1, wherein the scrolling instruction to which the identified cursor positioning event is mapped is a touch sensor triggered scrolling instruction.

6. A system for implementing scrolling within a display, the system comprising:
- a memory; and
- a processor configured to implement the steps of:
  - executing a virtual instance of a guest operating system within a host operating system that is implemented on a computing system, wherein:
    - the guest operating system is different from the host operating system; and
    - a guest operating system application program is executed within the virtual instance of the guest operating system;
    - the virtual instance of the guest operating system is launched by a host operating system software application that is configured to emulate a hardware architecture capable of implementing the guest operating system; and
    - the host operating system software application has implemented therewithin, a mapping layer comprising a scroll mapping controller, wherein the mapping layer is communicably interposed between one or more host operating system hardware device drivers and the guest operating system application program;
  - receiving at the scroll mapping controller, from a non-touch cursor positioning hardware device, one or more data signals representing a cursor positioning event, wherein the non-touch cursor positioning hardware device is a device other than a touchscreen or touchpad;
  - identifying the cursor positioning event; and
  - responsive to determining:
    - (i) that the identified cursor positioning event results in positioning of a displayed cursor within a predefined region of a user interface screen that is rendered on the display by the guest operating system application program that is being executed within the virtual instance of the guest operating system, and
    - (ii) that positioning of the displayed cursor within the predefined region of the user interface screen is mapped to a scrolling instruction associated with the guest operating system application program that is being executed within the virtual instance of the guest operating system,
  - implementing the scrolling instruction within the user interface screen that is rendered by the guest operating system application program that is being executed within the virtual instance of the guest operating system, wherein implementing the scrolling instruction does not require detection of any event other than positioning of the displayed cursor within the predefined region of a user interface screen;
  - wherein:
    - implementing the scrolling instruction within the user interface screen comprises generating through the scroll mapping controller, a translated instruction to trigger a scrolling event within the user interface screen that is rendered by the guest operating system application program that is being executed within the virtual instance of the guest operating system, wherein the translated instruction has parameters that are consistent with an instruction protocol set associated with a touchscreen or touchpad.

7. The system as claimed in claim 6, wherein identifying the cursor positioning event comprises identifying a position on a display or display interface at which a cursor requires to be displayed, positioned or moved to.

8. The system as claimed in claim 6, wherein the non-touch cursor positioning hardware device is not a touch sensor based cursor positioning hardware device.

9. The system as claimed in claim 6, wherein the non-touch cursor positioning hardware device is configured to control positioning of a cursor independent of user input from any of a touchpad or touchscreen or touch sensor.

10. The system as claimed in claim 6, wherein the scrolling instruction to which the identified cursor positioning event is mapped is a touch sensor triggered scrolling instruction.

11. A computer program product for implementing scrolling within a display, the computer program product comprising a non-transitory computer usable medium having computer readable program code embodied therein, the computer readable program code comprising instructions for implementing at a processor, the steps of:
- executing a virtual instance of a guest operating system within a host operating system that is implemented on a computing system, wherein:
  - the guest operating system is different from the host operating system; and
  - a guest operating system application program is executed within the virtual instance of the guest operating system;
  - the virtual instance of the guest operating system is launched by a host operating system software application that is configured to emulate a hardware architecture capable of implementing the guest operating system; and
  - the host operating system software application has implemented therewithin, a mapping layer comprising a scroll mapping controller, wherein the mapping layer is communicably interposed between one or more host operating system hardware device drivers and the guest operating system application program;
- receiving at the scroll mapping controller, from a non-touch cursor positioning hardware device, one or more data signals representing a cursor positioning event, wherein the non-touch cursor positioning hardware device is a device other than a touchscreen or touchpad;
- identifying the cursor positioning event; and
- responsive to determining-that:
  - (i) that the identified cursor positioning event results in positioning of a displayed cursor within a predefined region of a user interface screen that is rendered on the display by the guest operating system application program that is being executed within the virtual instance of the guest operating system, and
  - (ii) that positioning of the displayed cursor within the predefined region of the user interface screen is mapped to a scrolling instruction associated with the guest operating system application program that is being executed within the virtual instance of the guest operating system,
- implementing the scrolling instruction within the user interface screen that is rendered by the guest operating system application program that is being executed within the virtual instance of the guest operating system, wherein implementing the scrolling instruction does not require detection of any event other than positioning of the displayed cursor within the predefined region of a user interface screen;

wherein:

implementing the scrolling instruction within the user interface screen comprises generating through the scroll mapping controller,, a translated instruction to trigger a scrolling event within the user interface screen that is rendered by the guest operating system application program that is being executed within the virtual instance of the guest operating system, wherein the translated instruction has parameters that are consistent with an instruction protocol set associated with a touchscreen or touchpad.

12. The computer program product as claimed in claim 11, wherein identifying the cursor positioning event comprises identifying a position on a display or display interface at which a cursor requires to be displayed, positioned or moved to.

13. The computer program product as claimed in claim 11, wherein the non-touch cursor positioning hardware device is not a touch sensor based cursor positioning hardware device.

14. The computer program product as claimed in claim 11, wherein the non-touch cursor positioning hardware device is configured to control positioning of a cursor independent of user input from any of a touchpad or touchscreen or touch sensor.

15. The computer program product as claimed in claim 11, wherein the scrolling instruction to which the identified cursor positioning event is mapped is a touch sensor triggered scrolling instruction.

\* \* \* \* \*

UNITED STATES PATENT AND TRADEMARK OFFICE
CERTIFICATE OF CORRECTION

| | | |
|---|---|---|
| PATENT NO. | : 12,493,405 B2 | Page 1 of 1 |
| APPLICATION NO. | : 17/412326 | |
| DATED | : December 9, 2025 | |
| INVENTOR(S) | : Harsh Singh et al. | |

It is certified that error appears in the above-identified patent and that said Letters Patent is hereby corrected as shown below:

In the Claims

Column 22, Line 53, Claim 11, delete "determining-that:" and insert -- determining: --

Signed and Sealed this
Tenth Day of February, 2026

John A. Squires
*Director of the United States Patent and Trademark Office*